United States Patent Office 3,819,821
Patented June 25, 1974

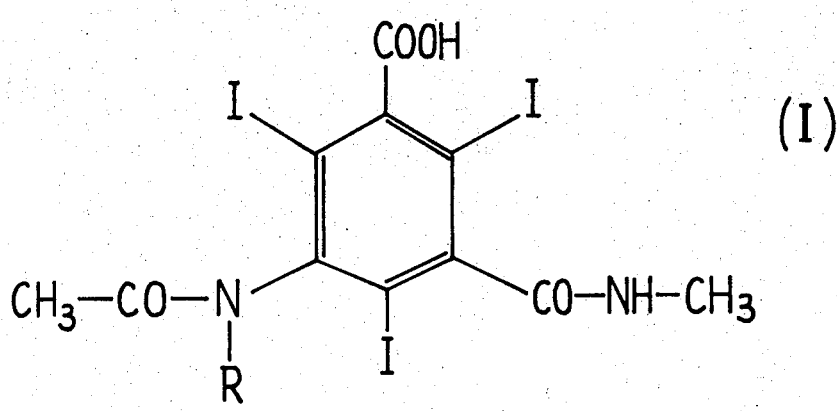
(I)

3,819,821
X-RAY OPACIFIERS
Guy Tilly, Drancy, France, assignor to Laboratoires
Andre Guerbet, Aulnay-sous-Bois, France
Filed Apr. 5, 1971, Ser. No. 131,344
Claims priority, application France, Apr. 15, 1970,
7013555
Int. Cl. A61k 27/00
U.S. Cl. 424—5                                6 Claims

ABSTRACT OF THE DISCLOSURE

The acids of the formula:

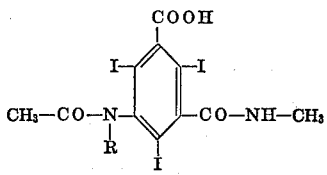

in which R is alkyl are X-ray opacifiers.

---

This invention provides an opacifier useful for radiography, particularly urography, angiography and myelography.

This opacifier comprises, as active ingredient, an acid of the formula (I), illustrated in the accompanying drawing, in which R is a lower alkyl radical.

R is advantageously a radical having from 1 to 6 carbon atoms, and preferably 1 to 2 carbon atoms.

The acids (I) may be used in free form, as lower alkyl esters ($C_1$–$C_6$) or as salts or salt mixtures, particularly as alkali metal salts, such as sodium, potassium, ammonium, as alkaline earth metal salts, such as calcium, or as organic base salts, such as ethanolamine or methylglucamine.

Since it is preferred to use said salts in the form of aqueous solutions, isolation from the aqueous media in which they are prepared is unnecessary. Such preparation comprises neutralizing acids (I) in aqueous media, with the stoichiometric amount of base. In fact, a plurality of bases may be used simultaneously. The resulting salt solutions, with optionally added preservatives such as disodium calcium tetracetate, are sterilized, for example by heating at 110° C. during ten minutes, and then adjusted to pH 7.

Acids (I) are new products which may be prepared by alkylation of iotalamic acid.

5-Acetamido - 2,4,6 - triiodo-3-(methylcarbamyl)-benzoic acid or iotalamic acid is a known material and processes for its preparation may be found in Hoey et al., J. Med. Chem., 6, 24 (1963) and in French Pat. 1,313,088.

The alkylation, and particularly the methylation or ethylation is advantageously effected by reacting iotalamic acid with a reagent of the formula $X(R)_n$ in which R has the above-defined meaning, X is an anionic residue and $n$ is the valence of this residue.

For example, reagents in which X is halogen, particularly iodine and chlorine, or a sulfate anion, may be used.

This exothermal reaction is advantageously effected at a temperature below about 40° C., by cooling the reactor walls. Generally, the reaction is effected within a range from about 10° C. to 30° C. It is advisable to add the reagent portionwise.

The following examples illustrate the preparation process according to the invention.

EXAMPLE 1

2,4,6-Triiodo-3-N-methylcarbamyl-5-(N-methyl-acetamido)benzoic acid; $R=CH_3$ 122.8 g. of iotalamic acid are dissolved in 92 ml. 5N sodium hydroxide.

10 ml. of water are added to give a readily stirrable solution and 24.5 ml. of dimethyl sulfate are added thereto dropwise, with vigorous stirring. The reaction is exothermal. The reaction flask is cooled externally so that the temperature of the mixture will not exceed 30° C. When the methyl sulfate addition is complete, the solution is stirred overnight at room temperature.

The desired acid is then precipitated with dilute hydrochloric acid, after which it is suction filtered and washed with water.

Purification of this acid is effected via the sodium salt, which is prepared under the following conditions:

17 ml. of 5N sodium hydroxide are added to 59 g. of the acid.

After stirring 1.5 hour at 70° C., 50 ml. of 12N sodium hydroxide are added. The sodium salt precipitates out and crystallizes subsequently. It is suction filtered, redissolved in water and the desired acid is then precipitated out from this solution with dilute hydrochloric acid.

It is then suction filtered, washed with water and dried.
Dry weight: 61.5 g. Yield: 49%.
M.P.=301° C. (instantaneous, determined with Maquenne block).
Acidity: 99%; iodine number: found: 59.5%; calculated: 60.6%.

EXAMPLE 2

2,4,6-Triiodo-3-N-methylcarbamyl-5-(N-ethyl-acetamido)-benzoic acid; $R=C_2H_5$ 61.4 g. of iotalamic acid are dissolved in 42 ml. of 5N sodium hydroxide. At a temperature of 20° C., 8.9 ml. of ethyl iodine are added dropwise, after which the mixture is stirred at 40° C. overnight.

The desired acid is precipitated with dilute hydrochloric acid.

After cooling to 0° C. over several hours, the acid is suction filtered, washed, dried and crystallized from methanol.
Dry weight: 41.7 g.; Yield: 65%.
M.P.=340° C.; acidity: 99.5%.
Iodine number: Found: 59.2%; calculated: 58.6%.

As shown by the pharmacological investigations reported below, the acids and the salts thereof demonstrate little toxicity on the nerve tissue.

This low neurotoxicity was shown by the determination of the lethal doses 50 by the intracerebral route in mice.

Thus, the following table gives said lethal doses for various solutions of methylglucamine salt having the same iodine concentration of 28% and prepared from acids commonly used for X-ray purposes and from the acids according to the invention.

| Salt designation | Lethal dose 50 in mice, by the intracerebral route | |
|---|---|---|
| | Salt g./kg. | Iodine, g./kg. |
| Methylglucamine diatrizoate | 0.085 | 0.04 |
| Methylglucamine iotalamate | 0.32 | 0.15 |
| 2,4,6-triiodo-3-N-methylcarbamyl-5-(N-hydroxy ethyl-N-acetylamino)-benzoic acid, methyl-glucamine salt ($R:CH_2$—$CH_2O$ in the formula in the drawing) | 0.58 | 0.26 |
| Methylglucamine salt of Example 1 | 0.75 | 0.35 |

Thus, the toxicity of acids (I) is less, by a factor of about two, than that of iotalamic acid. The lethal dose of the latter, as iodine, is almost three times less than that of the acid according to the invention of Example 1.

This surprising neuro-innocuousness is advantageous for all radiography applications, such as urography and angiography, investigations for which a more highly neuro-toxic opacifier was used heretofore. Above all, however, this neuro-innocuousness makes it possible to extend the application of the opacifier according to the invention to a field which was heretofore forbidden to ioxitalamic acid or its known derivatives, viz., myelography.

The results of pharmacological tests demonstrating the opacifying properties and the innocuousness of acids (I) are reported below.

Urography.—A solution of the methylglucamine salt of the acid of Example 1 having a 28% iodine concentration is injected at a rate of 12 ml./minute in the marginal vein of the ear of three rabbits, weighing 2.5–3.5 kg., which are fasted and given no water during twenty hours prior to the test.

The X-ray pictures were taken 5 minutes, 10 minutes, 20 minutes, 50 minutes, 80 minutes after injection.

Already in the first picture, the pelvis renalis are opacified, as are the ureters. The calices renalis become visible on later pictures, fifty to eighty minutes after injection. Opacification of the bladder is gradual and intense.

Angiography.—Any vascular injection of the same material gives excellent X-ray pictures of the injected vessels and of the vascular organs.

Myelography.—2 ml. of spinal fluid was taken by cisternal puncture from a 28 kg. dog anesthesized with pentothal.

2 ml. of solution of the methylglucamine salt of Example 1 (solution having an iodine concentration of 28%) were then injected.

The animal was maintained with its head erect during fifteen minutes. X-ray evidence was obtained of the cistern and of the dorsal sub-arachnoidal region.

One hour after injection, the animal walks and its condition is entirely normal on the following days. Such an injection, effected under the same conditions (same volume and same iodine concentration) with a salt of another acid of the table produces systematically convulsive fits.

Taking the above data into account, acids (I) are useful in human medicine—as confirmed by clinical experimentation—as opacifiers for X-ray purposes. The prime applications of the opacifier according to the invention are urography, angiography and myelography.

Intravascular injection is the choice route of administration, however, the oral and the rectal routes are also useful.

The preferred pharmaceutical form of the opacifier consists of aqueous solutions of the active ingredient, the latter being then in salt form.

The aqueous solutions contain advantageously from 30 to 100 g., and preferably from 30 to 70 g. of salt or salt mixture per 100 ml. and the amount of such solutions injected in the spinal fluid may be varied from 5 to 20 ml.

Having now described my invention what I claim and desire to secure by Letters Patent is:

1. A radiological opacifier comprising, as opacifying ingredient, 30–100 g. of a derivative selected from the group consisting of a pharmaceutically acceptable acid of the formula

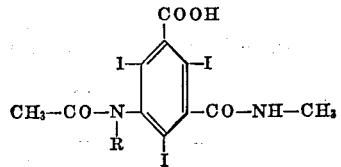

in which R is lower alkyl, and a pharmaceutically acceptable salt of said acid, per 100 ml. of a liquid physiologically administrable vehicle.

2. The product of claim 1, wherein the vehicle is water.

3. The product of claim 1 in which said salt is the methylglucamine salt.

4. The product of claim 1 in which said salt is the ethanolamine salt.

5. A process for effecting a myelography in a patient, wherein an amount of from 5 to 20 ml. of an aqueous solution of 30–100 g. per 100 ml. of a derivative selected from the group consisting of a pharmaceutically acceptable acid of the formula

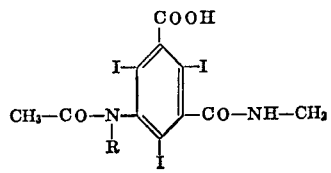

in which R is lower alkyl, and a pharmaceutically acceptable salt of said acid, is administered to said patient by injection thereof into the spinal fluid.

6. The process of claim 5 wherein said salt is the methylglucamine salt.

References Cited

UNITED STATES PATENTS 3,145,197    8/1964    Hoey _____ 424—5

FOREIGN PATENTS 1,469,823    1/1967    France _____ 260—518 A

OTHER REFERENCES

Chem. Abs., vol. 58, 1963, p. 10623e.

STANLEY J. FRIEDMAN, Primary Examiner

U.S. Cl. X.R.

260—518 A